US011232323B2

(12) United States Patent
Sung et al.

(10) Patent No.: US 11,232,323 B2
(45) Date of Patent: Jan. 25, 2022

(54) METHOD OF MERGING IMAGES AND DATA PROCESSING DEVICE

(71) Applicant: SAMSUNG ELECTRONICS CO., LTD., Suwon-si (KR)

(72) Inventors: Changhun Sung, Yongin-si (KR); Deokhwan Kim, Pyeongtaek-si (KR); Byungdeok Kim, Yongin-si (KR); Taeui Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/027,733

(22) Filed: Sep. 22, 2020

(65) Prior Publication Data

US 2021/0342633 A1 Nov. 4, 2021

(30) Foreign Application Priority Data

Apr. 29, 2020 (KR) .................. 10-2020-0052115

(51) Int. Cl.
*G06K 9/36* (2006.01)
*G06K 9/62* (2006.01)
*G06T 5/50* (2006.01)
*G06T 7/00* (2017.01)
*G06T 7/32* (2017.01)

(52) U.S. Cl.
CPC .......... *G06K 9/6211* (2013.01); *G06K 9/6215* (2013.01); *G06T 5/50* (2013.01); *G06T 7/32* (2017.01); *G06T 7/97* (2017.01); *G06T 2207/10016* (2013.01)

(58) Field of Classification Search
CPC ...... G06K 9/6211; G06K 9/6215; G06T 7/32; G06T 7/97; G06T 5/50; G06T 2207/10016
USPC ........................................................ 382/284
See application file for complete search history.

(56) References Cited

U.S. PATENT DOCUMENTS

| 8,723,978 | B2 | 5/2014 | Kwon et al. |
| 9,466,107 | B2 | 10/2016 | Lin et al. |
| 9,547,935 | B2 | 1/2017 | Haglund et al. |
| 10,382,674 | B2 | 8/2019 | Sharma et al. |

(Continued)

FOREIGN PATENT DOCUMENTS

| KR | 934211 | 12/2009 |
| KR | 1256194 | 4/2013 |

(Continued)

*Primary Examiner* — Stephen P Coleman
(74) *Attorney, Agent, or Firm* — Volentine, Whitt & Francos, PLLC

(57) ABSTRACT

Feature points included in input images are extracted and matching information indicating mapping relationships for feature points included in different input images is generated. A reference image is selected among the input images based on the matching information. Valid images are determined among the input images by excluding noise images from the input images based on the matching information. A two-dimensional bundle adjustment is performed to generate synchronized images by aligning the valid images to the reference image. A merged image is generated by merging the reference image and the synchronized images. Image merging performance is enhanced by selecting the reference image highly correlated with the other input images and estimating exact homography based on the reference image.

20 Claims, 23 Drawing Sheets

(56) References Cited

U.S. PATENT DOCUMENTS

| | | | |
|---|---|---|---|
| 10,511,776 B2 | 12/2019 | Zhu | |
| 2015/0229840 A1* | 8/2015 | Sawai | G06T 3/4038 348/36 |
| 2018/0158199 A1* | 6/2018 | Wang | G06K 9/6202 |

FOREIGN PATENT DOCUMENTS

| | | |
|---|---|---|
| KR | 1633893 | 6/2016 |
| KR | 1 884565 | 7/2018 |

* cited by examiner

FIG. 7

|  | $I_0$ | $I_1$ | $I_2$ | $I_3$ | $I_4$ |
|---|---|---|---|---|---|
|  | $X_{01}$ |  | $X_{21}$ | $X_{31}$ |  |
|  | $X_{02}$ | $X_{11}$ | $X_{22}$ | $X_{32}$ |  |
|  | $X_{03}$ |  | $X_{23}$ |  | $X_{41}$ |
|  |  | $X_{12}$ | $X_{24}$ |  | $X_{42}$ |
|  |  | $X_{13}$ | $X_{25}$ | $X_{33}$ | $X_{43}$ |
|  | $X_{04}$ | $X_{14}$ | $X_{26}$ | $X_{34}$ |  |
|  | $X_{05}$ |  | $X_{27}$ | $X_{35}$ | $X_{44}$ |

MINF

FIG. 10

$$\begin{bmatrix} h_1 & h_2 & h_3 \\ h_4 & h_5 & h_6 \\ h_7 & h_8 & h_9 \end{bmatrix} \begin{bmatrix} u \\ v \\ 1 \end{bmatrix} = \begin{bmatrix} u' \\ v' \\ 1 \end{bmatrix} \Leftrightarrow \begin{Bmatrix} uh_1 + vh_2 + h_3 = u' \\ uh_4 + vh_5 + h_6 = v' \\ uh_7 + vh_8 + h_9 = 1 \end{Bmatrix} \Leftrightarrow HX = X'$$

$$\begin{bmatrix} 0 & 0 & 0 & -u & -v & -1 & v'u & v'v & v' \\ u & v & 1 & 0 & 0 & 0 & -u'u & -u'v & -u' \\ -v'u & -v'v & -v' & u'u & u'v & u' & 0 & 0 & 0 \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} 0 \\ 0 \\ 0 \end{bmatrix} \Leftrightarrow Ah = 0$$

| | $I_0$ | $I_1$ | $I_2$ | $I_3$ | $I_4$ | $SN_i$ |
|---|---|---|---|---|---|---|
| $I_0$ | – | 25 | 37 | 17 | 28 | 107 |
| $I_1$ | 25 | – | 41 | 31 | 19 | 116 |
| $I_r \rightarrow I_2$ | 37 | 41 | – | 32 | 39 | 149 |
| $I_3$ | 17 | 31 | 32 | – | 15 | 95 |
| $I_4$ | 28 | 19 | 39 | 15 | – | 101 |

METHOD OF MERGING IMAGES AND DATA PROCESSING DEVICE

CROSS-REFERENCE TO RELATED APPLICATION

This U.S. non-provisional application claims priority under 35 USC § 119 to Korean Patent Application No. 10-2020-0052115 filed on Apr. 29, 2020 in the Korean Intellectual Property Office (KIPO), the subject matter of which is hereby incorporated by reference.

BACKGROUND

1. Technical Field

Embodiments of the inventive concept relate generally to image processing. More particularly, embodiments of the inventive concept relate to methods of merging images and data processing devices capable of performing same.

2. Discussion of the Related Art

In the field of computer vision images are merged using corresponding points between the images. The merged image may be applied to various image processing techniques, such as image stitching, noise reduction, dynamic range conversion, etc. Image merging may be performed through three-dimensional (3D) bundle adjustment that optimize camera parameters (e.g., rotation, movement, etc.) for multiple cameras. According to the 3D bundle adjustment, the camera parameters may be optimized using a 3D point group that is shared by multiple images. When two-dimensional (2D) images are merged, it is difficult to obtain the 3D point group because camera motion is not significant. The 3D bundle adjustment is unsuitable for the merging of 2D images and homography between the 2D images is required instead of the camera parameters.

SUMMARY

Embodiments of the inventive concept provide methods that are capable of efficiently merging 2D images, as well as data processing devices capable of performing same.

In a method of merging images according to embodiments of the inventive concept, feature points included in input images are extracted and matching information indicating mapping relationships for the feature points included in different input images is generated. A reference image is selected among the input images based on the matching information. Valid images are determined among the input images by excluding noise images from the input images based on the matching information. A two-dimensional bundle adjustment is performed to generate synchronized images by aligning the valid images to the reference image. A merged image is generated by merging the reference image and the synchronized images.

According to embodiments of the inventive concept, a method of merging images, includes, extracting feature points included from input images and generating matching information indicating mapping relationships for the feature points included in different input images, for each input image among the input images, determining a correlation value between feature points of the each input image and feature points of the other input images among the input images based on the matching information, selecting, as a reference image, the input image having a highest correlation value among the input images, determining valid images among the input images by excluding noise images from the input images based on the matching information, determining a cost function based on the matching information such that coordinates of the feature points of the reference image and homography matrices indicating transformations between the reference image and the valid images are set as independent parameters of the cost function, determining optimal homography matrices and optimal feature points corresponding to a minimum value of the cost function by adjusting the feature points of the reference image and the homography matrices, determining a correction matrix indicating transformation between the feature points of the reference image and the and the optimal feature points, generating synchronized images by aligning the feature points of the valid images to a two-dimensional plane corresponding to the reference image using the correction matrix and the optimal homography matrices, and generating a merged image by merging the reference image and the synchronized images.

According to embodiments of the inventive concept, a data processing device includes a feature point generator, a reference image selector, an image filter, a synchronizer and an image merger. The feature point generator extracts feature points included in input images and generates matching information indicating mapping relationships for the feature points included in different input images. The reference image selector selects a reference image among the input images based on the matching information. The image filter determines valid images among the input images by excluding noise images from the input images based on the matching information. The synchronizer performs a two-dimensional bundle adjustment to generate synchronized images by aligning the valid images to the reference image. The image merger generates a merged image by merging the reference image and the synchronized images.

The method of merging images and data processing devices performing the method according to embodiments of the inventive concept may enhance image merging performance by selecting the reference image which is highly correlated with the other input images and estimating exact homography based on the reference image.

In addition, the method of merging images and data processing devices performing the method according to embodiments of the inventive concept may enhance the image merging performance by removal of noise images from the input images, optimization of the homography matrix by the two-dimensional bundle adjustment and/or the homography refinement.

BRIEF DESCRIPTION OF THE DRAWINGS

Embodiments of the inventive concept will be more clearly understood upon consideration of the following detailed description taken in conjunction with the accompanying drawings.

FIG. 7 is a conceptual diagram illustrating an example of matching information that may be used by a method of merging images according to embodiments of the inventive concept.

FIG. 10 is a set of mathematical expressions describing a homography matrix that may be used by a method of merging images according to embodiments of the inventive concept.

DETAILED DESCRIPTION

Figure 1:
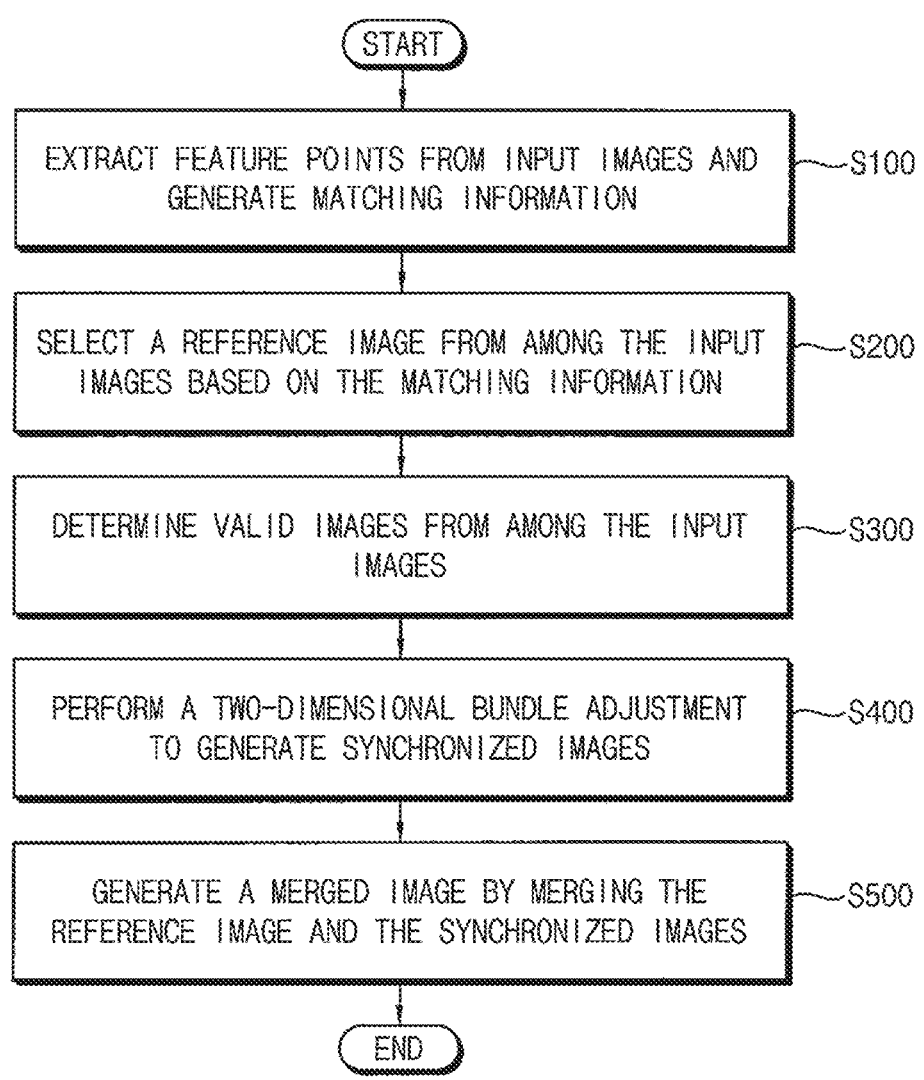
FIG. 1 is a flow chart summarizing a method of merging images according to embodiments of the inventive concept.

Certain embodiments of the inventive concept will be described in some additional detail with reference to the accompanying drawings. Throughout the written description and drawings like reference numbers and labels are used to denote like or similar elements and/or features.

Figure (FIG.) 1 is a flow chart summarizing a method of merging images according to embodiments of the inventive concept.

Initially, feature points included in input images are extracted and matching information indicating mapping relationships for the feature points respectively included in different input images is generated (S100).

Here, the input images may be a set of correlated images to be merged. For example, the input images may include at least a portion of the same scene.

In some embodiments, as will be described hereafter with reference to FIG. 4A, the input images may be images respectively captured by multiple cameras. Alternately, the input images may be images sequentially captured by a single camera.

The extraction of the feature points and generation of the matching information may be accomplished using a variety of approaches. Example of possible approaches that may be used to extract the feature points and generate the matching information will be described hereafter with reference to FIGS. 5, 6 and 7.

A reference image may be selected from among the input images based on the matching information (S200).

Here, a correlation value may be determined for each input image among the input images. This may be accomplished, for example, using feature points from an input image and feature points of the other input images may be determined based on the matching information. Once a set of correlation values has been determined from the input images, the input image among the input images having a greatest (or highest) correlation value may be selected as the reference image.

In various embodiments of the inventive concept, different approaches may be used to determine the respective correlation values for the input images. For example, each correlation value may be determined based on a Euclidian distance between two reprojected points that are obtained by aligning two corresponding feature points respectively included in two of the input images to a same two-dimensional plane.

Examples of possible approaches that may be used to the determine the correlation values—that may thereafter be used to select a reference image from among the input images—will be described with reference to FIGS. 8, 9, 10, 11, 12, 13 and 14.

Valid images may be determined from among the input images (S300). This may be accomplished, for example, by excluding noise images from the input images based on the matching information.

In some embodiments, a reference correlation value between the feature points of the reference image and the feature points of each input image may be determined. Then, using the reference correlation value, a determination may be made as to whether each input image is the noise image or the valid image.

Here, for example, the reference correlation value may be determined based on a Euclidian distance between two reprojected points obtained by aligning two corresponding feature points respectively included in the reference image and the each input image to a same two-dimensional plane.

One approach to the removal of the noise images from the input images will be described in some additional detail with reference to FIG. 15.

A two-dimensional bundle adjustment may be performed to generate synchronized images (S400). This may be accomplished, for example, by aligning valid images with the reference image.

In some embodiments, a cost function value may be determined based on the matching information, and the valid images may be aligned with the reference image such that the cost function value is minimized.

In some embodiments, the cost function may be a reprojection error function corresponding to a sum of Euclidian distances between feature points of the reference image and reprojected points obtained by aligning the feature points of valid images to a two-dimensional plane corresponding to the reference image.

Approaches that may be used to accomplish the two-dimensional bundle adjustment will be described in some additional detail with reference to FIGS. 16 and 17.

A merged image may be generated by merging the reference image with the synchronized images (S500).

In some embodiments, the merged image may be generated by blending the reference image and the synchronized images. For example, the blending of images may be performed using a graph cut segmentation algorithm, a seam cut and multiband blending algorithm, etc.

In some embodiments, image stitching may be performed using the reference image and the synchronized images to generate the merged image. Boundaries of stitched portions may be sharpened during the stitching process due to alignment error or exposure deviation between images, and image blending may be performed to smooth the sharpened boundaries. Here, the boundary problem of the stitched portions may be minimized and the exact merged image may be obtained using the synchronized images that are aligned to, or coordinate-synchronized to the reference image.

In some embodiments, a merged image of high dynamic range (HDR) may be generated using the reference image and the synchronized images.

The merging of reference image and synchronized images may be performed using various approaches, such as (e.g.,) image stitching, noise reduction, HDR conversion, etc.

In some embodiments, image merging may be efficiently performed using the matching information which indicates mapping relationships between feature points and homography, regardless of the 3D point group used in the conventional 3D bundle adjustment.

As such, the method of merging images, as well as data processing devices performing same, according to embodiments of the inventive concept may enhance image merging performance by selecting one input image as a reference image that is highly correlated with other input images, and estimating exact homography based on the reference image.

In addition, the method of merging images, as well as data processing devices capable of performing same, according to embodiments of the inventive concept may enhance the image merging performance through the removal of noise images from the input images, the optimization of a homography matrix using a two-dimensional bundle adjustment and/or homography refinement.

Figure 2:
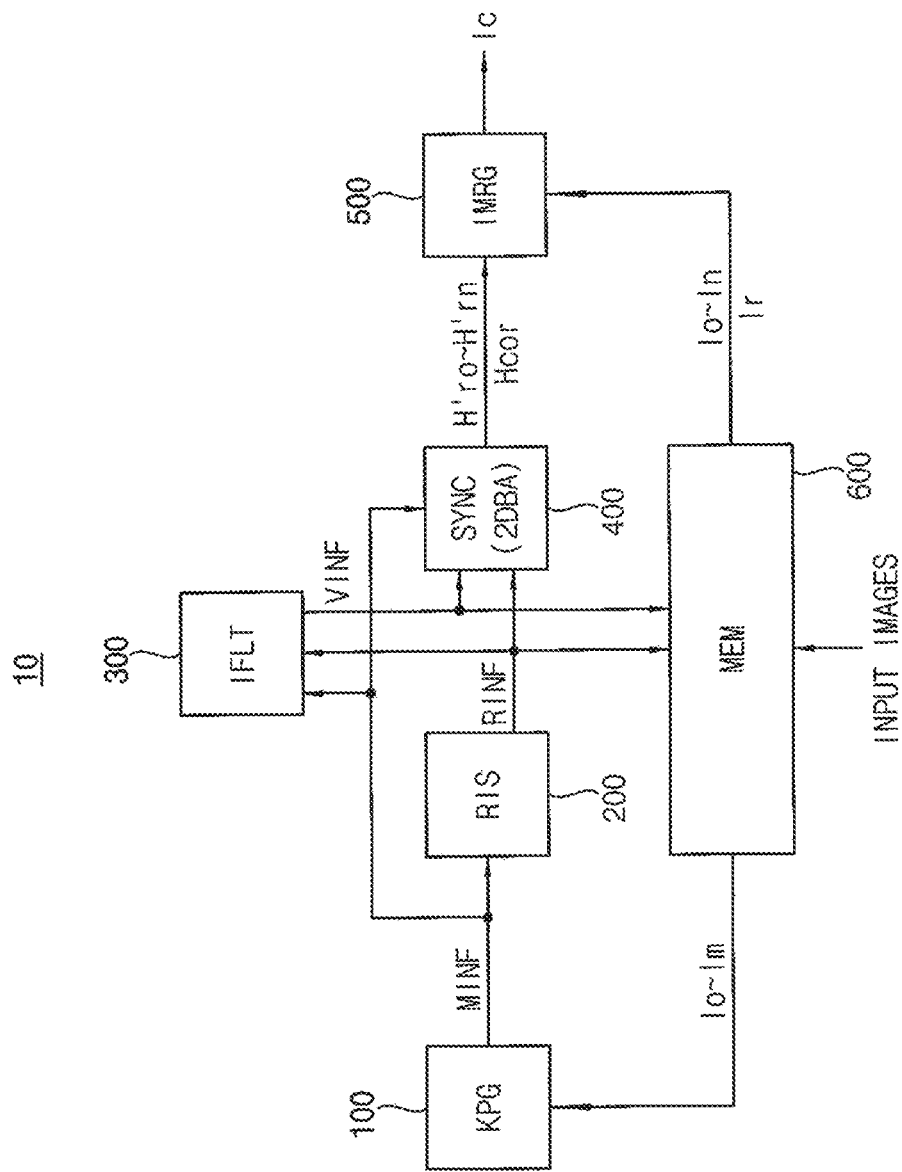
FIG. 2 is a block diagram illustrating an image processing device according to embodiments of the inventive concept.

FIG. 2 is a block diagram illustrating an image processing device 10 according to embodiments of the inventive concept.

Referring to FIG. 2, the image processing device 10 may include; a feature point generator (KPG) 100, a reference image selector (RIS) 200, an image filter (IFLT) 300, a synchronizer (SYNC) 400, an image merger (IMRG) 500 and a memory (MEM) 600.

The feature point generator 100 may be used to extract feature points (or key points) from a set of input images (Io~Im), and generate matching information indicating mapping relationships for feature points included in different input images. The feature point generator 100 may provide the matching information to the reference image selector 200 and the synchronizer 400. Here, the matching information may be further provided to the image merger 500 to be used during image merging.

In this regard, one possible approach to the definition of matching information (MINF) that may be used in relation to certain embodiments of the inventive concept will be described in some additional detail with reference to FIG. 7.

The reference image selector 200 may select a reference image (Ir) from among the input images based on the matching information, generate reference image information (RINF) indicating the selected reference image, and provide the reference image information to the image filter 300, synchronizer 400 and memory 600.

In one possible approach, the reference image information may include an image number (or an image index) associated with the reference image.

The image filter 300 may be used to distinguish valid images (Io~In) from noise images among the input images based on the matching information. In this regard, for example, the image filter 300 may generate valid image information (VINF) and provide the valid image information to the synchronizer 400 and memory 600.

In one possible approach, the valid image information may include image numbers (or image indices) associated with valid images among the input images.

The synchronizer 400 may be used to perform a two-dimensional bundle adjustment (2DBA) in order to generate synchronized images by aligning valid images with the reference image. In some embodiments, the synchronizer 400 may provide bundle adjustment homography matrices (H'ro~H'rn) and a correction matrix (Hcor) corresponding to the result of the two-dimensional bundle adjustment to the image merger 500. Examples of the bundle adjustment homography matrices and the correction matrix will be described in some additional detail with reference to FIGS. 16 and 17.

The image merger 500 may generate a merged image (Ic) by merging the reference image with the synchronized images. The image merger 500 may generate the synchronized images by aligning (or coordinate-synchronizing) the valid images with the reference image based on the result of the two-dimensional bundle adjustment (e.g., the bundle adjustment homography matrices and the correction matrix). The image merger 500 may perform various image processes using the reference image and the synchronized images, such as the image stitching, the noise reduction, and the HDR conversion as described above.

The memory 600 may receive and store images provided from an external device such as a camera. In this regard, the memory 600 may provide the set of input images to be merged to the feature point generator 100. The memory 600 may also provide the reference image, as well as valid images, to the image merger 500 based on the reference image information and the valid image information. The memory 600 may be a memory device dedicated to the data processing device 10 or a memory device commonly accessed by components of a system including the data processing device 10.

Figure 3:
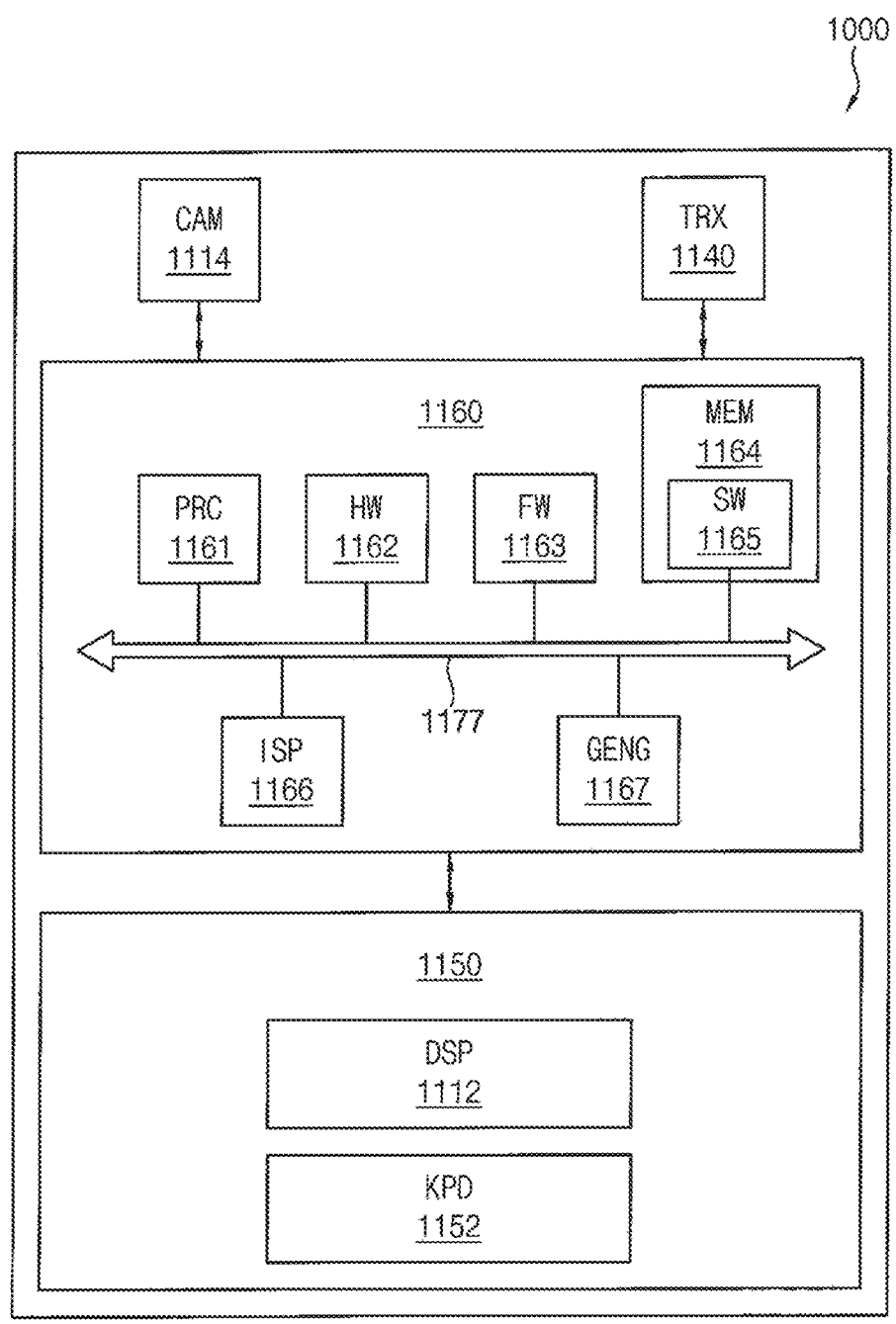
FIG. 3 is a block diagram illustrating a system according to embodiments of the inventive concept.

FIG. 3 is a bloc diagram illustrating a system 1000 according to embodiments of the inventive concept.

Referring to FIG. 3, the system 1000 may include a camera module (CAM) 1114, a transceiver (TRX) 1140, a control unit 1160 and a user interface 1150.

The camera module 1114 may include at least one camera or an image sensor configured to capture and provide the input images. The camera module 1114 may include multiple cameras respectively providing one or more of the input images. Alternately, the camera module 1114 may include a single camera providing the input images.

The transceiver 1140 may provide whatever connectivity the system 1000 requires. Such connectivity may include wired and/or wireless links to other networks such as the Internet, a cellular network, etc.

The user interface 1150 may include input devices (KPD) 1152 such as a keyboard, a keypad, etc. and a display device (DSP) 1112 capable of displaying images captured by the camera module 1114. If appropriate to particular designs, a virtual keypad may be integrated into the display device 1112 having touch screen/sensor technology in order to obviate the input device 1152.

The control unit 1116 may include a general purpose processor (PRC) 1161, a hardware device (HW) 1162, a firmware device (FW) 1163, a memory (MEM) 1164, an image signal processor (ISP) 1166, a graphics engine (GENG) 1167, and a bus 1177. The control unit 1160 may perform the various methods for merging images described herein. That is, the control unit 1160 may be configured to perform functions of the data processing device 10 described in FIG. 2, for example.

Here, it should be noted that embodiments of the inventive concept may be variously implemented in hardware, firmware and/or software.

In some embodiments, image merging method(s) according to embodiments of the inventive concept may be performed using the image signal processor 1166. In some embodiments, image merging methods according to embodiments of the inventive concept may be performed according to a program instructions executed by a processing device. The program instructions may be stored in the memory 1164 as software 1165, and the program instructions may be performed by the general purpose processor 1161 and/or the image signal processor 1166.

To execute the program instructions, for example, the general purpose processor 1161 may retrieve or fetch the program instructions from an internal register, an internal cache or the memory 1164 and decode and execute them. During or after execution of the program instructions, the general purpose processor 1161 may write one or more results (which may be intermediate or final results) of the program instructions to the internal register, internal cache or the memory 1164.

The system 1000 may be a computer system taking one of many possible forms. For example, the system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instructions for implementing a method of merging images according to embodiments of the inventive concept may be stored in a computer-readable non-transitory storage medium or media. The computer-readable non-transitory storage medium may include one or more semiconductor-based or other integrated circuits (ICs), such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4A:
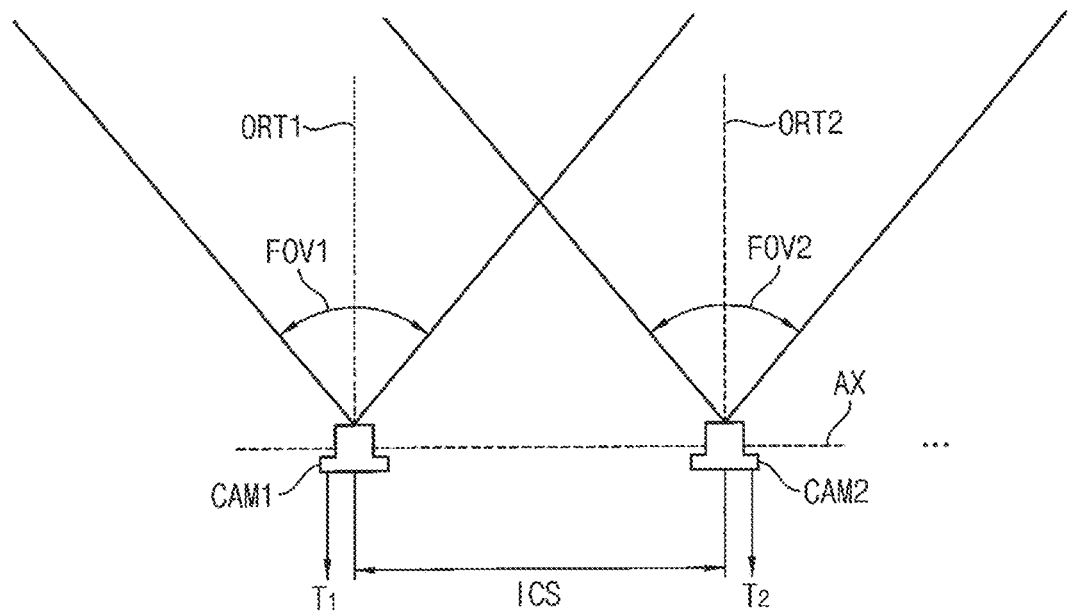
FIGS. 4A and 4B are conceptual diagrams illustrating cameras arrangements that may provide input images that are later merged according to embodiments of the inventive concept.
Figure 4B:
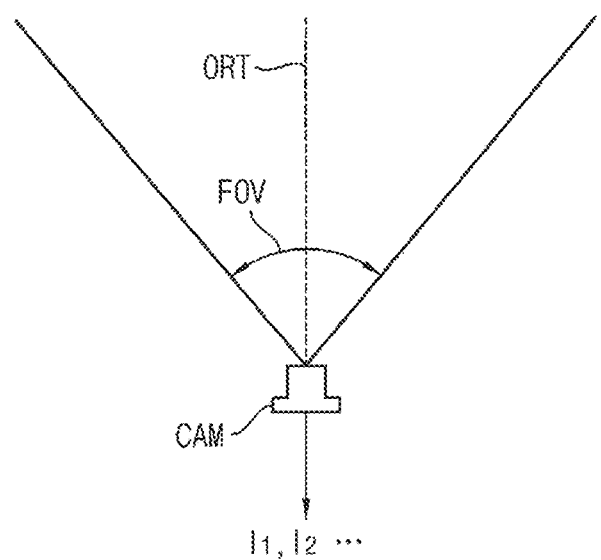

FIGS. 4A and 4B are respective, conceptual diagrams illustrating approaches to the capture of input images that may be later merged in various embodiments of the inventive concept.

FIG. 4A illustrates an example in which an array of cameras including a first camera CAM1 and a second camera CAM2 disposed along an axis (AX). The input images described above may include images I1 and I2, respectively captured by the cameras CAM1 and CAM2. In convenience of illustration, only two (2) cameras CAM1 and CAM2 are shown in FIG. 4A. However, those skilled in the art will recognize that three or more cameras may be used in other embodiments.

In some embodiments, each of the cameras CAM1 and CAM2 may include an image sensor configured to capture individual images or a series of images (e.g., a video). For example, the cameras CAM1 and CAM2 may include a charge-coupled device (CCD) image sensor or a complementary metal-oxide-semiconductor (CMOS) active-pixel image sensor.

Each camera in the array of cameras has a particular field of view (FOV) that depends on a variety of factors such as; relative camera position, focal length, magnification in use, camera size, etc. As illustrated in FIG. 4A, the first camera CAM1 has a first field of view FOV1 and the second camera CAM2 has a second field of view FOV2 different from the first field of view FOV1.

In this regard, the field of view for a camera may refer to a horizontal, vertical, or diagonal extent of a particular scene imaged by the camera. Objects within the field of view of the camera may be captured by an image sensor of the camera, and objects outside the field of view may not appear on the image sensor.

A camera may have an orientation that represents an angle or a direction in which the camera is pointing. As illustrated in FIG. 4A, the camera CAM1 may have a first orientation ORT1 and the camera CAM2 may have a second orientation ORT2 different from the first orientation ORT1.

Depending on an inter-camera spacing ICS, the field of views FOV1 and FOV2 and the orientations ORT1 and ORT2, an overlapping portion of a first image I1 and a second image I2, respectively captured by the cameras CAM1 and CAM2, may vary. Accordingly, synchronization or coordinate-synchronization is required by aligning the images I1 and I2 to a same two-dimensional plane in advance to merge the images I1 and I2 efficiently.

As illustrated in FIG. 4B, the input images later merged by embodiments of the inventive concept may include a first image I1 and a second image I2, sequentially captured by a single camera (CAM). For example, the images I1 and I2 may be images captured in a serial capturing mode or images that are oversampled to enhance image quality. In these cases, the time interval may occur between the images I1 and I2, and the overlapping portion of the images I1 and I2 may vary due to hand movement by the user, etc. As the case of FIG. 4A, synchronization (or coordinate-synchronization) is required by aligning the images I1 and I2 to the same two-dimensional plane in advance to merge the images I1 and I2 efficiently.

Figure 5:
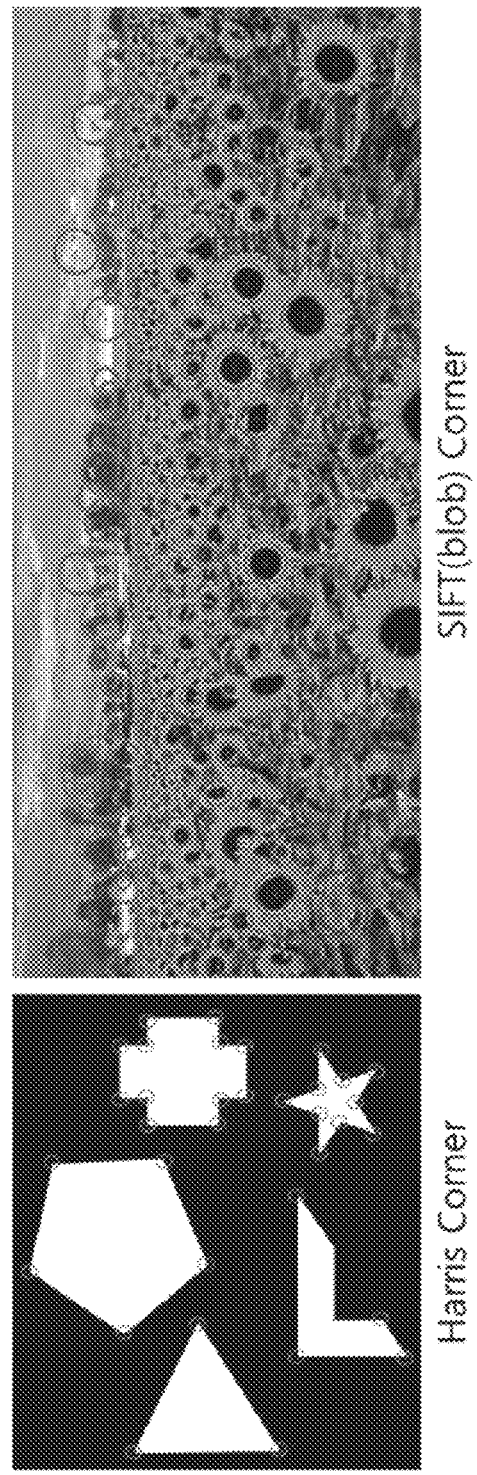
FIG. 5 is an image illustrating approaches to the extraction of feature points used in a method of merging images according to embodiments of the inventive concept.
Figure 6A:
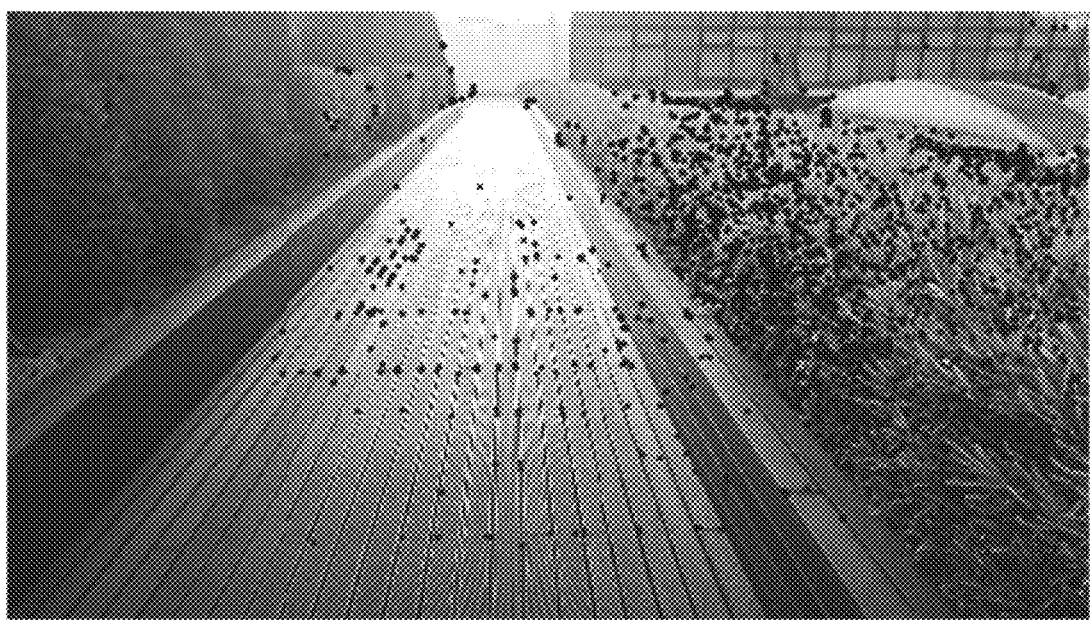
FIGS. 6A, 6B, 6C, 6D and 6E are images illustrating a set of input images that may be used in conjunction with embodiments of the inventive concept.
Figure 6B:
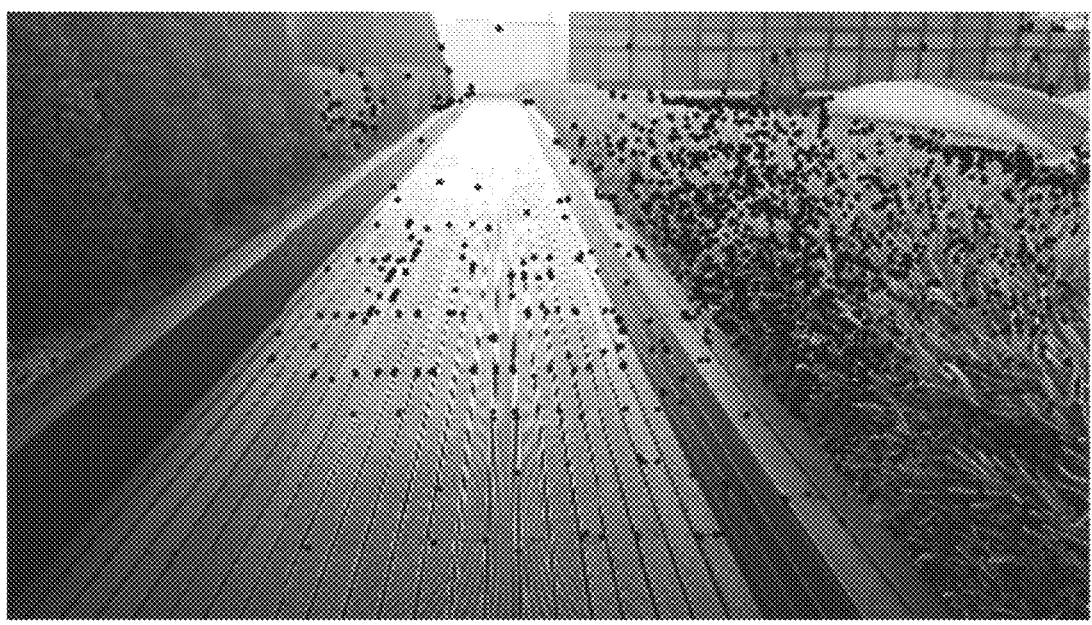
Figure 6C:
Figure 6D:
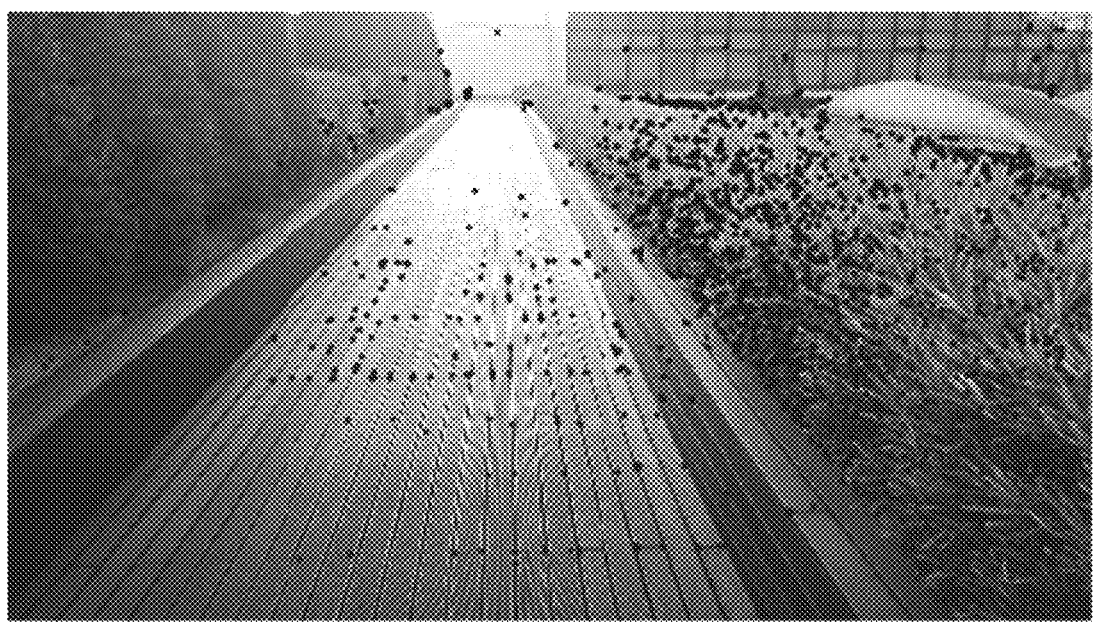
Figure 6E:

FIG. 5 is an image illustrating certain approaches that may be used to extract feature points in methods of merging images according to embodiments of the inventive concept.

Image matching may be implemented by extracting feature points in images to be merged. The feature points may be understood as key points or points of interest.

In order to match corresponding image portions, it is necessary to extract appropriate feature points that may be readily recognized (or detected) and differentiated from the image background. For example, conditions associated with appropriate feature points may include a high degree of discernment even though the shape and/or location of an object, camera parameter, illumination, etc. is (are) changed. One example of an appropriate feature point is a corner point, but many different approaches may be used. However, most feature point extraction approaches are based on corner point extraction(s) such as the Harris Corner and scale-invariant feature points (SIFT) corner also illustrated in FIG. 5.

In some embodiments, the feature point detection and point matching may be performed on grayscale versions of input images, and a particular contrast may be applied to the input images in a separate operation or through a look-up table. In some embodiments, feature point detection may be performed globally on the images using local contrast enhancement. Local contrast enhancement increases "local" contrast, while at the same time preventing an increase in "global" contrast, thereby protecting large-scale shadow/highlight detail. For example, local contrast gradients may be indicative of an edge, corner, or "blob" that corresponds to a feature. Features of the images may be detected using a feature detection algorithm such as, for example, scale-invariant feature transform (SIFT), speeded up robust features (SURF), or oriented FAST and Rotated BRIEF (ORB), where FAST stands for "features from accelerated segment test" and BRIEF stands for "binary robust independent elementary features." In some embodiments, a feature point detection process may detect one or more feature points. For example, feature points may be detected by taking a difference of multiple Gaussian smoothing operations. Furthermore, the position of the feature points and the contrast values of each feature point for each search region may be stored.

In some embodiments, a size of an area used to match feature points in different images may be set according to a size of images. In some embodiments, a geometry of camera system may be known, and based on the known camera-system geometry, an approximate number of pixels of the search regions and overlap areas of the images may be known a priori. For example, the location and orientation of cameras of the camera system may be fixed relative to one another, the overlap between the cameras may be known.

In some embodiments, determining corresponding pairs of the feature points respectively included in the different input images may be performed using a nearest-neighbor search algorithm. For example, a nearest-neighbor search algorithm may identify patterns of feature points within each search region of overlap area of one image that match corresponding patterns of feature points within each search region of the overlap area of another image. In some embodiments, a nearest-neighbor algorithm may use a search radius around each feature point to determine the pairs of corresponding feature points. For example, a search area may have a radius of 32 pixels, 64 pixels, or any suitable radius, or a search area may have a size of 32 pixels×32 pixels, 64 pixels×64 pixels, or any suitable size. In some example embodiment, a secondary refinement may be used to realign the pairs of corresponding feature points before a final homography calculation.

FIGS. 6A, 6B, 6C, 6D and 6E (hereafter FIGS. 6A through 6E) are images illustrating the merger of input images according to embodiments of the inventive concept.

FIGS. 6A through 6E shows, as an example, first through fifth images (I0~I4) to be merged and the extracted feature points are illustrated in them. It affects highly image merging performance what image is selected as a reference image among the first through fifth images where the other images are coordinate-synchronized to the reference image. Intuitionally, the third image I2 has most feature points but it is not desirable to select the reference image based on the number of feature points.

With respect to each input image among the input images, a correlation value between the feature points of the input image and the feature points of the other input images may be determined based on the matching information. Once correlation values for each of the input images have been determined, the input image having the greatest (or highest) correlation value may be selected as the reference image from among the input images. As such, the image merging performance may be enhanced by selecting the reference image highly correlated with the other input images and estimating exact homography based on the reference image.

FIG. 7 is a conceptual diagram illustrating an example of matching information that may be used by a method of merging images according to embodiments of the inventive concept.

In FIG. 7, an example of matching information for feature points Xij respectively included in the first through fifth images (I0~I4). Here, the feature points in the same row may correspond to the same location of the captured scene. For example, it will be understood form the matching information MINF that the feature point X02 of the first image I0, the feature point X11 of the second image I1, the feature point X22 of the third image I2, and the feature point X32 of the fourth image I3 correspond to one another and the fifth image I4 has no corresponding feature point.

Figure 8:
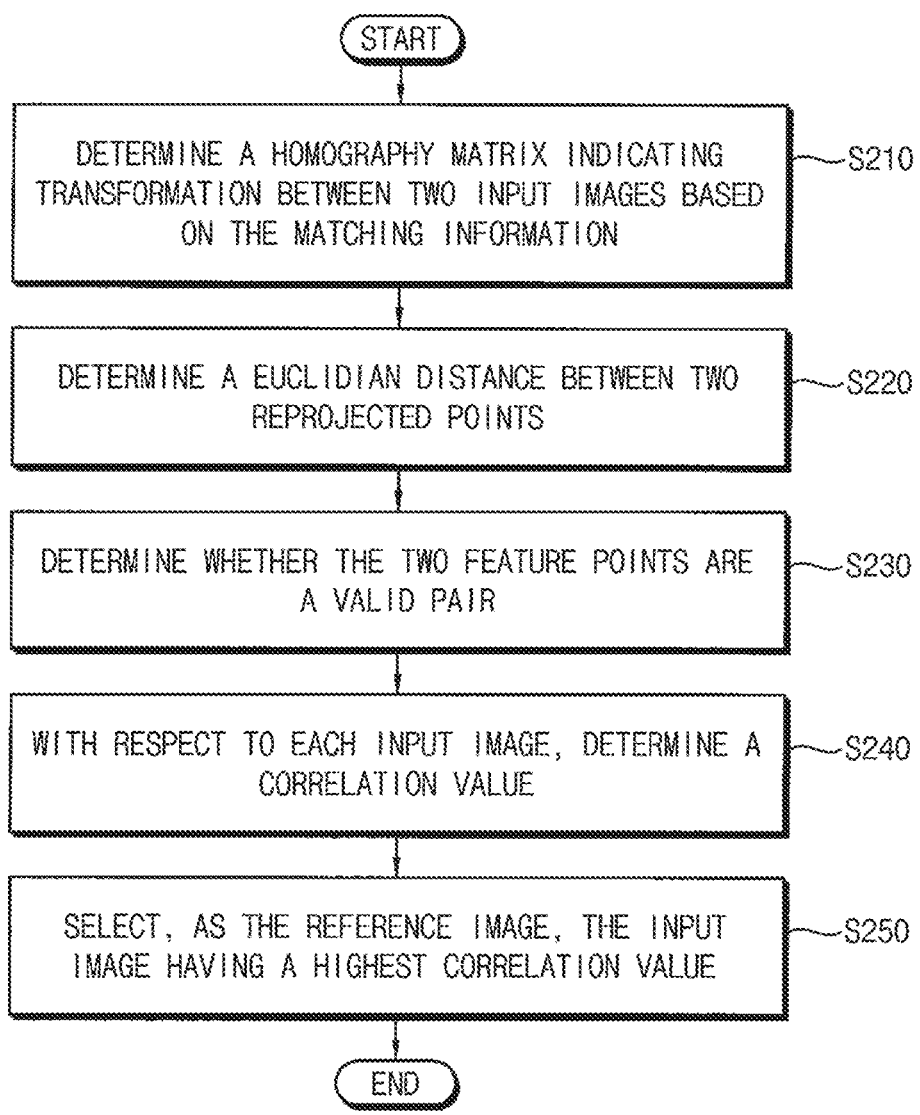
FIG. 8 is a flow chart summarizing a method of determining a reference image according to embodiments of the inventive concept.

FIG. 8 is a flow chart summarizing in one example a method step of determining a reference image according to embodiments of the inventive concept.

Referring to FIG. 8, a homography matrix indicating transformation between two input images may be determined based on the matching information (S210). Here, the matching information may relate to feature points included in the two input images.

Then, a Euclidian distance between two reprojected points may be determined (S220). This distance may be obtained, for example, by aligning two corresponding feature points respectively included in the two input images to a same two-dimensional plane using the homography matrix.

A determination may now be made as to whether the two feature points are a valid pair (S230). This may be accomplished, for example, by determining whether the Euclidian distance between the two reprojected points (S220) is less than a threshold distance.

With respect to each input image among the input images, a correlation value may be determined (S240). This may be accomplished, for example, by determining a corresponding sum of numbers for valid pairs between the feature points of each input image and feature points of the other input images.

A reference image may then be selected by identifying the input image having a highest correlation value among the input images (S250).

Hereinafter, operative examples of the method summarized in FIG. 8 will be described in some additional detail with reference to FIGS. 9A, 9B, 9C, 9D, 10, 11, 12, 13 and 14.

FIGS. 9A, 9B, 9C and 9D are images illustrating image transformations that may be used in methods of merging images according to embodiments of the inventive concept.

Image transformation may indicate obtaining a converted (or modified) image by applying a specific function of algorithm to an input image by applying (e.g.,) translation, rotation, scaling conversion and/or respective conversion to the input image.

Figure 9A:
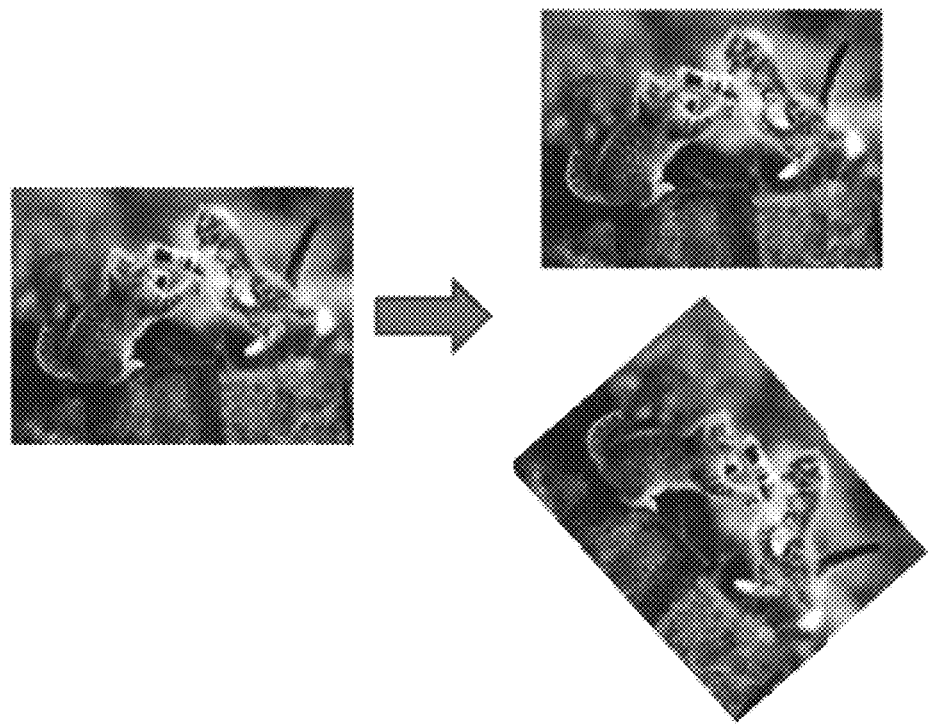
FIGS. 9A, 9B, 9C and 9D are diagram illustrating image transformations that may be used by a method of merging images according to embodiments of the inventive concept.
Figure 9B:
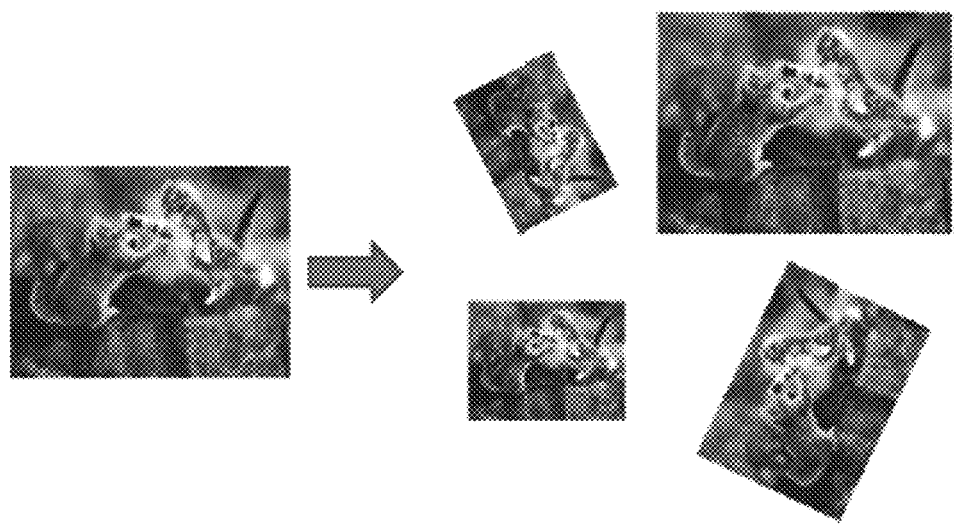
Figure 9C:
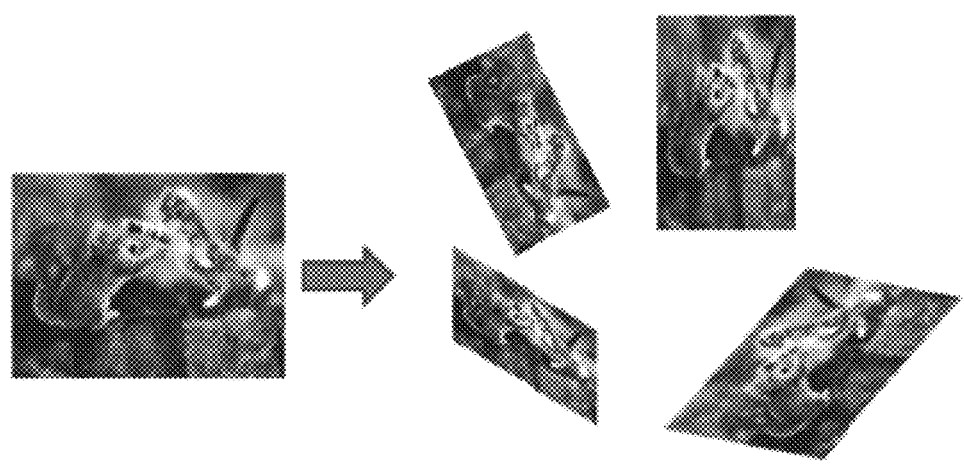
Figure 9D:
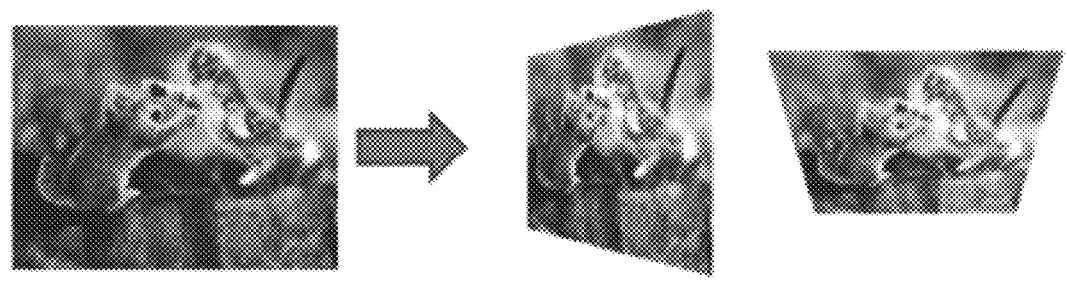

The image transformation may include (e.g.,) a rigid transformation like the one shown in FIG. 9A, a similarity transformation like the one shown in FIG. 9B, a affine transformation like the one shown in FIG. 9C, and/or a projective transformation like the one shown in FIG. 9D. Converted or transformed coordinates (x', y') may be obtained by applying such image transformation(s) to original coordinates (x, y).

The rigid transformation of FIG. 9A is a fundamental image transformation that fixes a magnitude of an image. That is, only the translation and the rotation are performed by the rigid transformation.

The similarity transformation of FIG. 9B further reflects the change of the magnitude or scale of the object and the shape of the object is conserved by the similarity transformation.

The Affine transformation of FIG. 9C adds feature of linearity conservation to the similarity transformation. Accordingly, parallelism of lines, ratio of length or distance may be conserved by the Affine transformation.

The projective transformation of FIG. 9D is a transformation to project an image of a 3D space to an image of a 2D space. The projective transformation indicates conversion between two images viewed from two different perspective points in the 3D space.

A matrix representing the image transformation between two images is referred to as a homography matrix or simply a homography. A relation representing a general projective transformation may be obtained to transform a first image to a second image or vice versa, and the relation is a transformation matrix that is called a homography matrix.

In image processing, image transformation is required with respect to two images captured from different perspective viewpoints or at two different points in time. The magnitude of the required homography is 3×3. The homography may be determined if only eight values are given. That is, at least four pairs of corresponding points are required to determine the homography.

FIG. 10 is a set of mathematical expressions describing a homography matrix that may be used in a method of merging images according to embodiments of the inventive concept.

Accordingly, FIG. 10 illustrates a process of obtaining a homography matrix H corresponding to one pair of points X(u, v, 1) and X' (u', v', 1) respectively included in two different images. The homography matrix H may be determined by obtaining components h1~H9 of the homography matrix H.

As illustrated in FIG. 10, the relation of HX=X' may be transformed to the relation of Ah=0 and the component vector 'h' may be obtained. With respect to one pair of corresponding points, the matrix A has a magnitude of 3×9, and the matrix A has a magnitude of 3nX9 with respect to n pairs of corresponding points.

Figure 11:
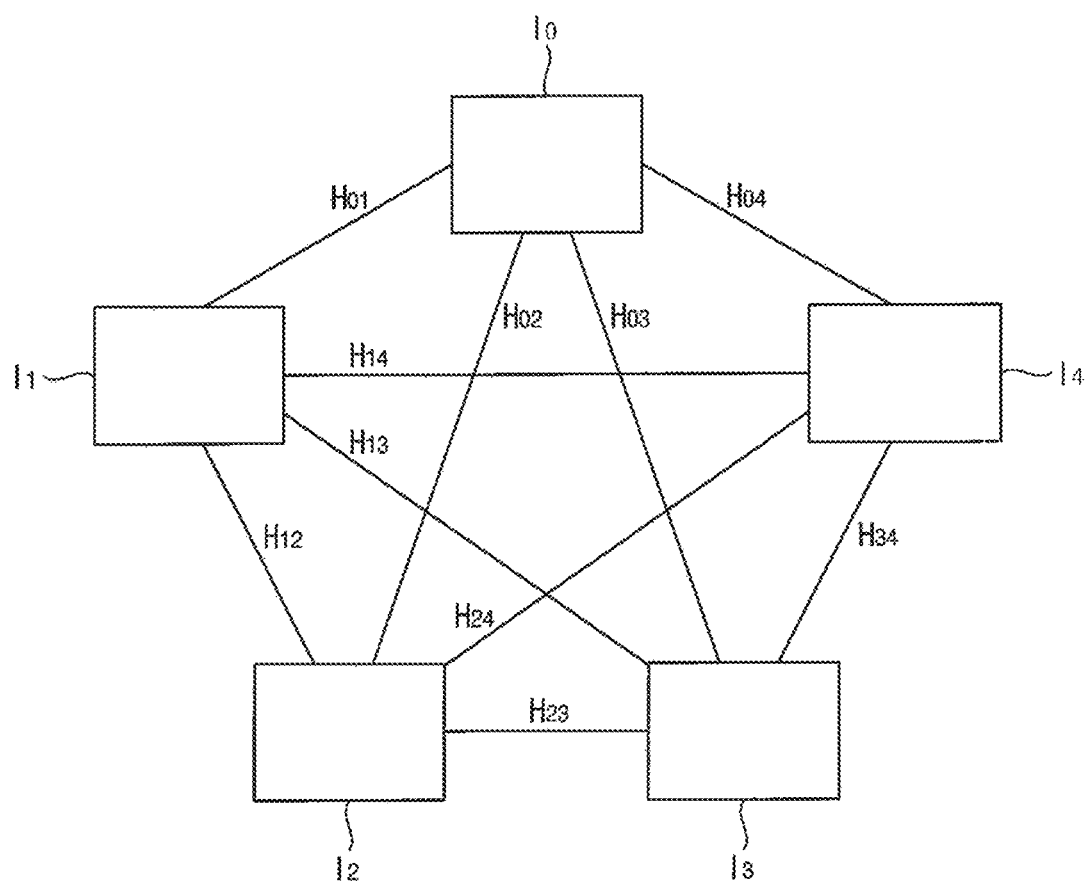
FIGS. 11, 12 and 13 are conceptual diagrams further illustrating a method of determining a reference image according to embodiments of the inventive concept.
Figures 12, 13:
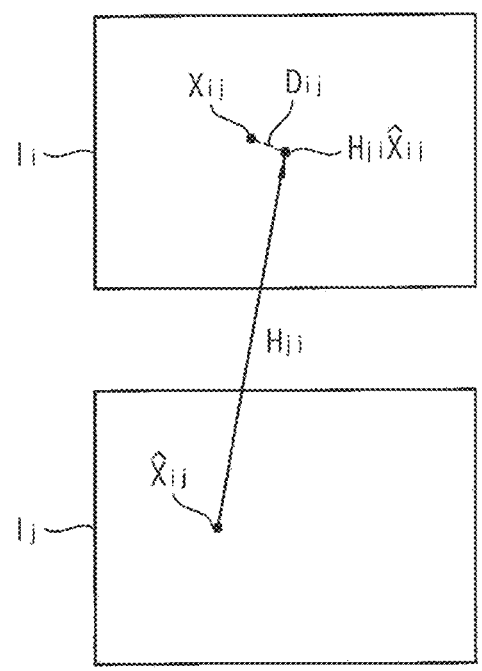

FIGS. 11, 12 and 13 are conceptual diagrams further illustrating a method of determining a reference image according to embodiments of the inventive concept.

Referring to FIG. 11, when first through fifth input images (I0~I4) are to be merged, homography matrices Hij (i=0~4, j=0~4) corresponding to respective transformations between every two different input images Ii and Ij. Hij indicates the homography matrix to transform the coordinates in the i-th input image Ii to the coordinates aligned to a two-dimensional plane corresponding the j-th image Ij. Hji is an inverse matrix of Hij and redundant matrices are omitted in FIG. 11.

As such, a homography matrix indicating transformation between two input images may be determined based on the matching information of the feature points included in the two input images (S210 of FIG. 8).

Referring to FIG. 12, a Euclidian distance Dij between two reprojected points Xij and HjiX^ij that are obtained by aligning two corresponding feature points Xij and X^ij respectively included in the two input images Ii and Ij to a same two-dimensional plane (for, example, the two-dimensional plane corresponding to the input image Ii as illustrated in FIG. 12) may be determined using the homography matrix Hji (S220 of FIG. 8). The Euclidian distance between the two reprojected points Xij and HjiX^ij may be represented by Expression 1.

$$Dij = \|Xij - HjiX\hat{}ij\| \qquad \text{Expression 1}$$

The two feature points Xij and X^ij may be determined as a valid pair when the Euclidian distance Dij is shorter than a threshold distance Dth (S230 of FIG. 8) as represented by Expression 2.

$$(Xij, X\hat{}ij): \text{inlier, if } Dij < Dth; \text{outlier, otherwise} \qquad \text{Expression 2}$$

FIG. 13 illustrates an example of a number of the valid pairs between every two images among the input images (I0~I4) and an a sum of numbers SNi with respect to each image Ii. As such, with respect to each input image of the input images, the correlation value corresponding to a sum of numbers of the valid pairs between the feature points of the each input image and the feature points of the other input images except the each input image may be determined (S240 of FIG. 8).

In FIG. 13, the correlation value SN0 of the first input image I0 with respect to the other input images I1, I2, I3 and I4 is 107, the correlation value SN1 of the second input image I1 with respect to the other input images I0, I2, I3 and I4 is 116, the correlation value SN2 of the third input image I2 with respect to the other input images I0, I1, I3 and I4 is 149, the correlation value SN3 of the fourth input image I3 with respect to the other input images I0, I1, I2 and I4 is 95, and the correlation value SN4 of the fifth input image I4 with respect to the other input images I0, I1, I2 and I3 is 101. In this case, the third input image I2 having the greatest correlation value of 149 may be determined as the reference image Ir. As such, the input image having a greatest (or highest) correlation value among the input images may be determined as the reference image (S250 of FIG. 8).

As such, the image merging performance may be enhanced by selecting the reference image considering the correlations between all of the input images.

Figure 14:
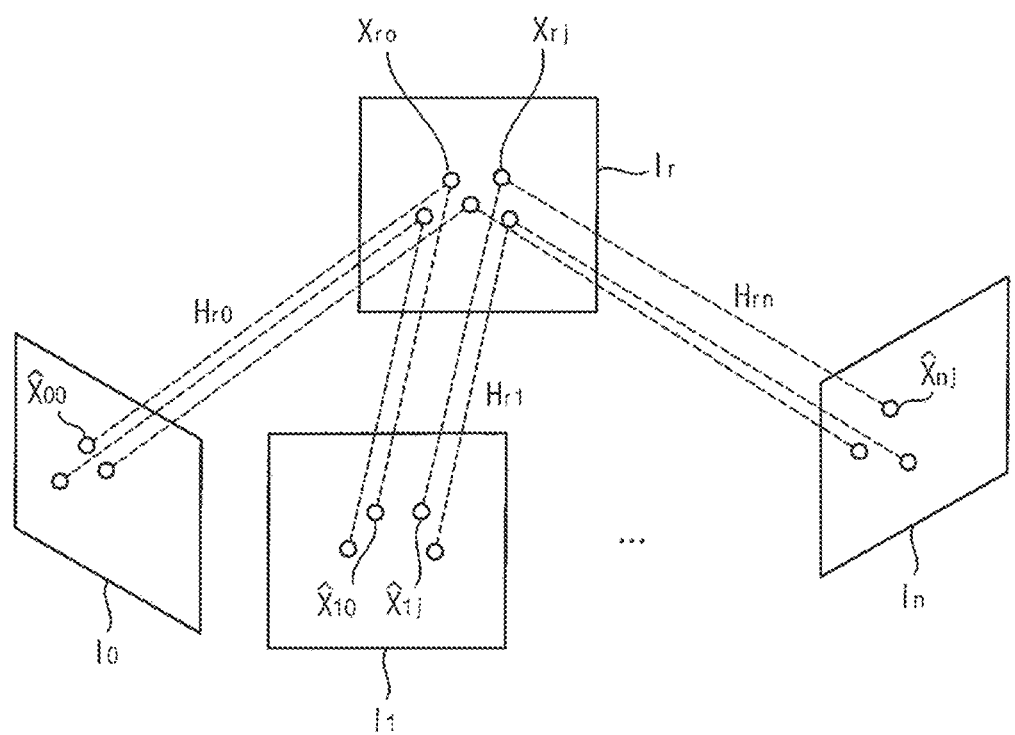
FIG. 14 is a conceptual diagram illustrating an example of a reference image and valid images, as determined by a method of merging images according to embodiments of the inventive concept.

FIG. 14 is a diagram illustrating an example of a reference image and valid images, as determined by a method of merging images according to embodiments of the inventive concept.

In FIG. 14, a reference image (Ir) and valid image (I0~In) have been determined according to the above-described methods, and the feature points included therein. The feature points Xrj of the reference image Ir are connected by dashed lines to the feature points X^ij of each valid image Ii. As will be described below with reference to FIGS. 16 and 17, the two-dimensional bundle adjustment according to embodiments of the inventive concept may be performed using initial homography matrices (Hr0~Hrn) indicating transformations between the reference image and the valid images.

Figure 15:
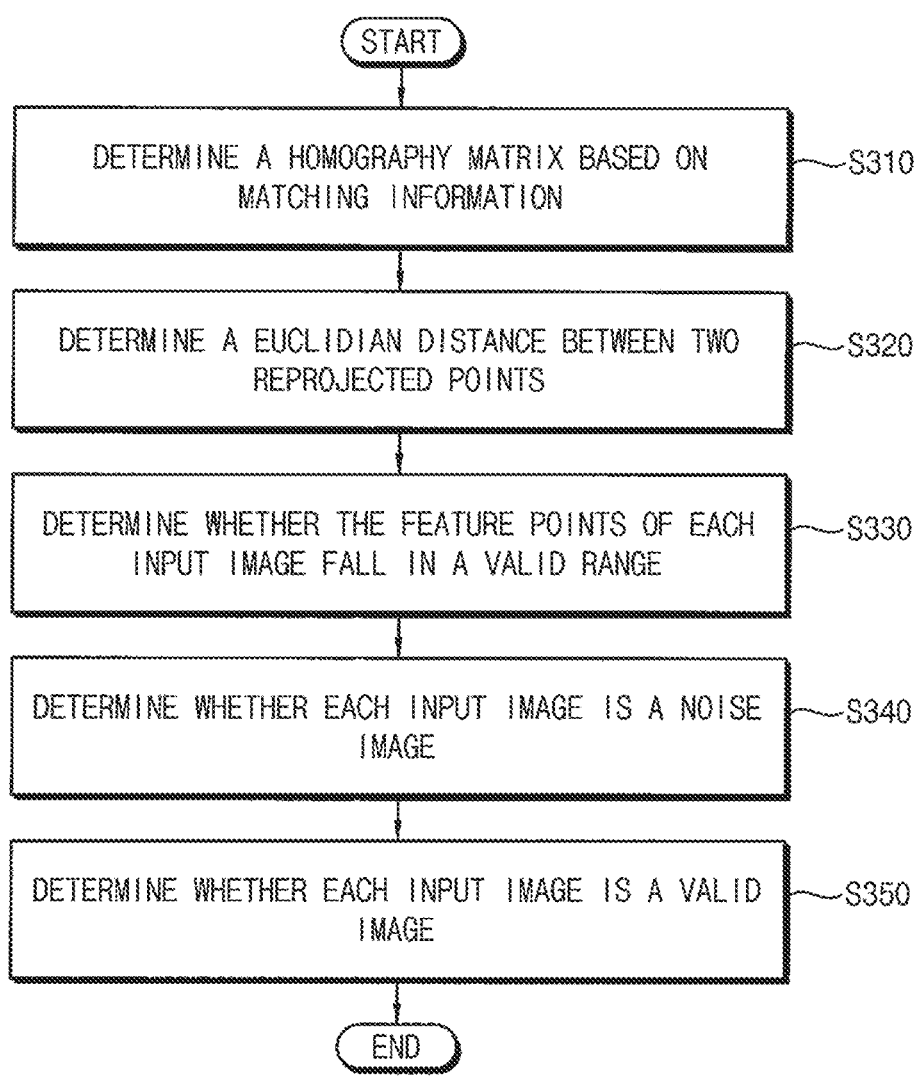
FIG. 15 is a flow chart summarizing a method of determining valid images according to embodiments of the inventive concept.

FIG. 15 is a flow chart summarizing a method of determining valid images according to embodiments of the inventive concept.

Referring to FIG. 15, a homography matrix indicating transformation between the reference image and each input image may be determined based on the matching information of the feature points included in the reference image and the feature points included in the each input image (S310).

Then, a Euclidian distance between two reprojected points may be determined (S320). This may be accomplished, for example, where the two reprojected points are obtained by aligning two corresponding feature points respectively included in the reference image and the each input image to a same two-dimensional plane using the homography matrix.

A determination may be made as to whether the feature point of each input image falls within a valid range (S330). This may be accomplished, for example, when the Euclidian distance is less than a threshold distance. The feature point within the valid range may indicate the corresponding two feature point respectively included in the reference image and the each input image is the valid pair as described with reference to Expression 2.

A determination may be made as to whether each input image is a noise image (S340). This may be accomplished, for example, when a number of feature points for the input image that fall within the valid range is less than a threshold number.

Alternately or additionally, a determination may be made as to whether each input image may is a valid image (S350). This may be accomplished, for example, when a number of feature points for each input that fall within the valid range is not less than the threshold number.

An approach to the determination of a feature point falling within the valid range may be the same as that described with reference to Expressions 1 and 2 above.

The determination(s) of noise image(s) and/or the valid image(s) may be described with reference to the example of FIG. 13. The third input image I2 may be determined as the reference image Ir in the example of FIG. 13. In this case, the number of the valid pairs of the first input image I0 is 37, the number of the valid pairs of the second input image I1 is 41, the number of the valid pairs of the fourth input image I3 is 32, and the number of the valid pairs of the fifth input image I4 is 39. If the threshold number is set to be 35, the fourth input image I3 having the number of the valid pairs smaller than the threshold number may be determined as the noise image, and the first input image I0, the second input image I2 and the fifth input image I4 having the number of the valid pairs greater than the threshold number may be determined as the valid images.

As such, the input images that are not appropriate for image merging (e.g., noise images distorted by blur or noise) may be excluded from the set of input images to be merged.

Figure 16:
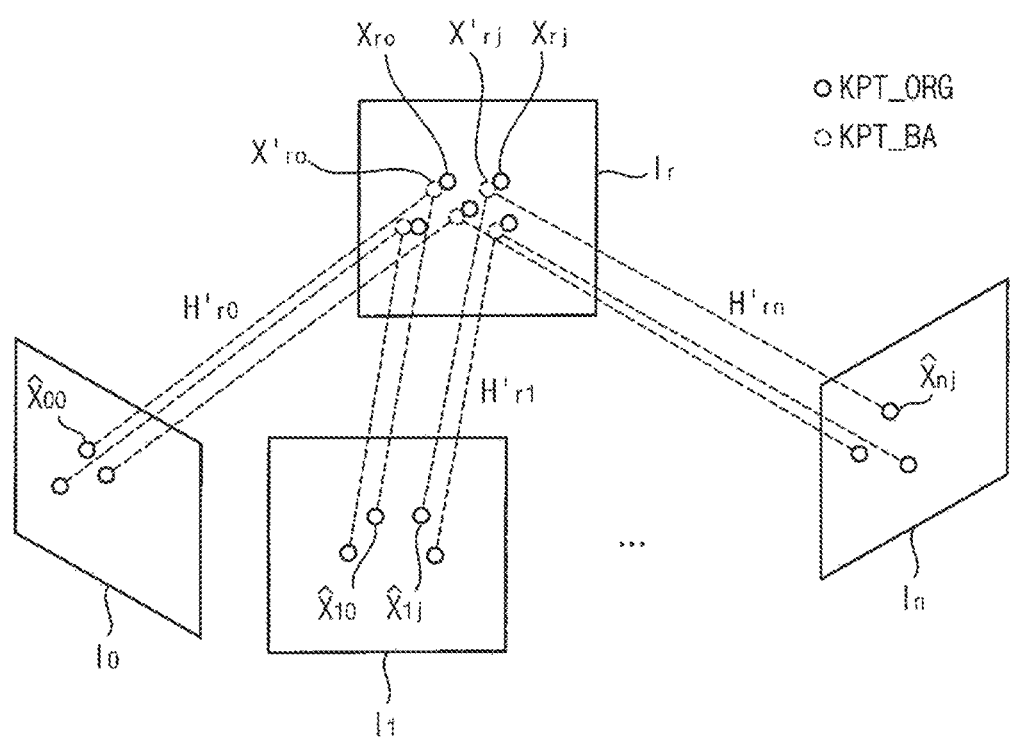
FIGS. 16 and 17 are conceptual diagrams describing a two-dimensional bundle adjustment for a method of merging images according to embodiments of the inventive concept.
Figure 17:
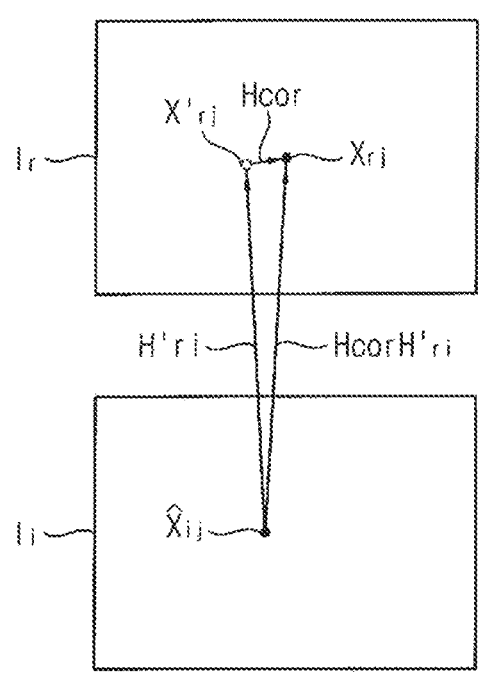

FIGS. 16 and 17 are respective diagrams describing a two-dimensional bundle adjustment that may be used in a method of merging images according to embodiments of the inventive concept.

FIG. 16 illustrates a reference image (Ir) and valid images (I0~In) that are determined according to the above-described methods, and the feature points included therein. In addition, FIG. 16 illustrates the bundle adjustment homography matrices (H'r0~H'rn) and the bundle adjustment feature points X'rj corresponding to the result of the two-dimensional bundle adjustment. The bundle adjustment homography matrices indicate the transformation between the bundle adjustment feature points X'rj of the reference image and the feature points X^ij of the valid images.

The two-dimensional bundle adjustment according to embodiments of the inventive concept may be performed by determining a cost function based on the matching information, and aligning the valid images to the reference image such that a cost function value is minimized Here, aligning the valid image to the reference image may indicate transforming the position or the coordinates of the valid image to the coordinates of the two-dimensional planed corresponding to the reference image.

In some embodiments, the cost function value may be determined according to a reprojection error function (Ereproj) as represented by Expression 3.

$$Ereproj = \sum_i^n \sum_j^k \|X_{rj} - H_{ri}\hat{X}_{ij}\|^2 \qquad \text{Expression 3}$$

The reprojection error function Ereproj of Expression 3 corresponds to a sum of Euclidian distances between the feature points X^ij of the reference image Ir and reprojected points HriX^ij that are obtained by aligning the feature points X^ij of the valid images to a two-dimensional plane corresponding to the reference image Ir.

As shown in Expression 3, coordinates of the feature points (Xr0~Xrk) of the reference image and initial homography matrices indicating transformations between the reference image and the valid images may be set as independent parameters of the cost function (e.g., the reprojection error function Ereproj).

The bundle adjustment homography matrices corresponding to the initial homography matrices when the value of the cost function becomes a minimum value and the bundle adjustment feature points corresponding to the feature points of the reference image when the value of the cost function becomes a minimum value may be determined.

In some embodiments, the bundle adjustment homography matrices and the bundle adjustment feature points may be determined by performing a partial differential operation with respect to the initial homography matrices and the feature points of the reference image. For example, the bundle adjustment homography matrices and the bundle adjustment feature points may be determined using a Gauss-Newton algorithm or a gradient-descent algorithm.

As illustrated in FIG. 17, the bundle adjustment feature points (X'r0~X'rk) may be deviated from the original feature points (Xr0 Xrk) of the reference image (Ir). Thus the errors may be caused if the feature points X^ij of the valid images are transformed using the bundle adjustment homography matrix (H'ri). The errors may be cured using a correction matrix (Hcor). In some embodiments, a correction matrix indicating transformation between the feature points of the reference image and the bundle adjustment feature points may be determined and the synchronized images may be generated by aligning the feature points of the valid images to a two-dimensional plane corresponding to the reference image using the correction matrix and the bundle adjustment homography matrices. The correction matrix (Hcor) indicating transformation between the feature points (Xr0~Xrk) of the reference image (Ir) and the bundle adjustment feature points (X'r0~X'rk) may be represented by Expression 4.

$$Xrj = HcorX'rj \qquad \text{Expression 4}$$

As a result, the feature points X^ij of the valid images may be aligned or coordinate-synchronized to the two-dimensional plane corresponding to the reference image Ir more accurately by transforming the feature points X^ij of the valid images using the matrices (HcorH'r0~HcorH'rn) that are products of the correction matrix (Hcor) and the bundle adjustment homography matrices (H'r0~H'rn).

Figure 18:
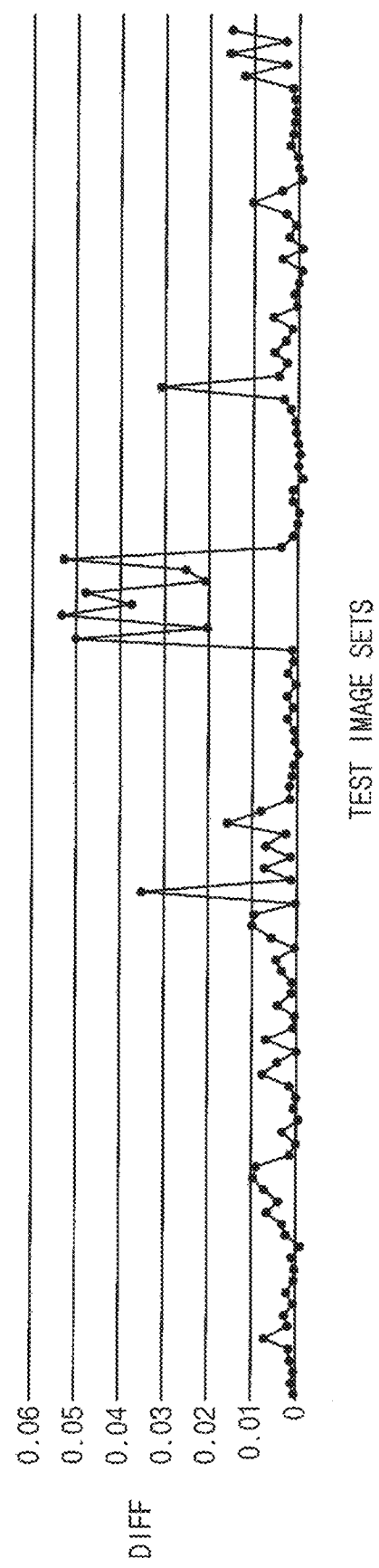
FIGS. 18 and 19 are graphs illustrating exemplary results of a method of merging images according to embodiments of the inventive concept.
Figure 19:
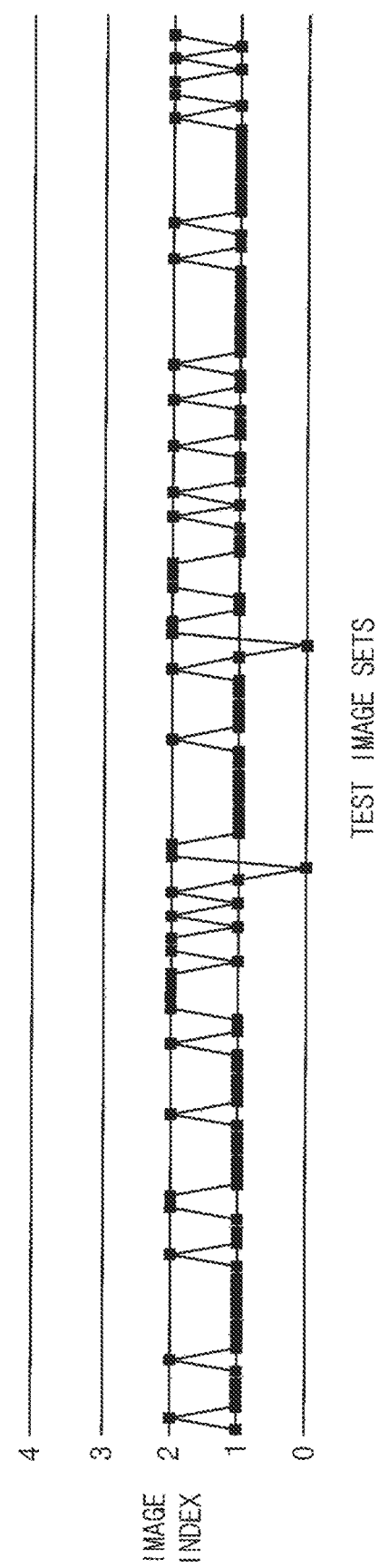

FIGS. 18 and 19 are graphs illustrating various exemplary results of a method of merging images according to embodiments of the inventive concept.

FIGS. 18 and 19 illustrates the results when the method of merging images according to embodiments of the inventive concept is applied to test image sets captured using a smartphone. Each test image includes five (5) input images.

In FIG. 18, the vertical axis represents a difference (DIFF) corresponding to a structural similarity index (SSIM) obtained by a method according to embodiments of the inventive concept and an SSIM obtained by a comparative, conventional method. The SSIM may be represented by Expression 5.

$$SSIM(x, y) = \frac{(2\mu_x\mu_y + c_1)(2\sigma_{xy} + c_2)}{(2\mu_x^2 + \mu_y^2 + c_1)(\sigma_x^2 + \sigma_y^2 + c_2)} \qquad \text{Expression 5}$$

In Expression 5, 'x' and 'y' indicate coordinates, μx indicates an average of x, μy indicates an average of y, σ2x indicates a dispersion of x, σ2y indicates a dispersion of y, and c1 and c2 are variable for stabilizing the denominator. The higher value of SSIM indicates the higher similarity with the reference image and the better performance of warping.

As illustrated in FIG. 18, the difference has the positive values with respect to almost all of the test image sets, which means the image merging performance according to embodiments of the inventive concept is better than that of the conventional scheme.

FIG. 19 illustrates the image index for an input image selected as the reference image according to embodiments of the inventive concept. As shown in FIG. 19, with respect to most of the test image sets, the second images (INDEX=1) or the third images (INDEX=2) are selected as the reference image. It is estimated that the intermediate image is selected as the reference image because of user movement while the test scene is substantially fixed.

As described above, methods of merging images and data processing devices capable of performing the methods according to embodiments of the inventive concept may enhance image merging performance by selecting a reference image that is highly correlated with the other input images, and estimating exact homography based with reference to the reference image.

In addition, methods of merging images and data processing devices capable of performing the methods according to embodiments of the inventive concept may enhance the image merging performance by removal of the noise images from a set of input images, optimization of the homography matrix using a two-dimensional bundle adjustment and/or the homography refinement.

The inventive concept may be applied to any electronic device or system benefiting from image processing. For example, embodiments of the inventive concept may be applied to systems such as mobile phones, smart phones, personal digital assistants (PDA), portable multimedia players (PMP), digital cameras, camcorders, personal computers (PC), server computers, workstations, laptop computers, digital TV sets, set-top boxes, portable game consoles, navigation systems, wearable devices, Internet of Things (IoT) devices, internet of everything (IoE) devices, e-books, virtual reality (VR) devices, augmented reality (AR) devices, etc.

The foregoing is illustrative of certain embodiments and is not to be construed as limiting to the scope of the inventive concept. Although a few embodiments of the inventive concept have been described, those skilled in the art will readily appreciate that many modifications are possible in these illustrated embodiments without materially departing from the scope of the inventive concept.

What is claimed is:

1. A method of merging images, comprising:
   extracting feature points from input images and generating matching information indicating mapping relationships for feature points from different input images;
   selecting a reference image from among the input images based on the matching information;
   determining valid images from among the input images by excluding noise images based on the matching information;
   performing a two-dimensional bundle adjustment to generate synchronized images by aligning the valid images with the reference image; and
   generating a merged image by merging the reference image and the synchronized images.

2. The method of claim 1, wherein selecting of the reference image includes:
   determining a homography matrix indicating transformation between two input images based on the matching information of feature points included in the two input images;
   determining a Euclidian distance between two reprojected points obtained by aligning two corresponding feature points respectively included in the two input images to a same two-dimensional plane using the homography matrix;
   determining that the two corresponding feature points are a valid pair when a Euclidian distance between the two corresponding feature points is shorter than a threshold distance;
   for each input image among the input images, determining a correlation value corresponding to a sum of numbers of valid pairs between feature points of the each input image and feature points of the other input images among the input images; and
   selecting as the reference image and input image among the input images having a highest correlation value.

3. The method of claim 1, wherein the determining of the valid images from among the input images includes:
   determining a homography matrix indicating transformation between the reference image and each one of the input images based on the matching information of feature points included in the reference image and feature points included in each one of the input images;
   determining a Euclidian distance between two reprojected points obtained by aligning two corresponding feature points respectively included in the reference image and the each one of the input images to a same two-dimensional plane using the homography matrix;
   determining whether feature points of each one of the input images fall within a valid range wherein a corresponding Euclidian distance is less than a threshold distance;
   determining whether each one of the input images is a noise image when a number of feature points for each one of the input images falls within the valid range less than a threshold number; and
   determining whether each one of the input images is a valid image when the number of feature points for each one of the input images falls within the valid range not less than the threshold number.

4. The method of claim 1, wherein the input images are images respectively captured by a plurality of cameras.

5. The method of claim 1, wherein the input images are images sequentially captured by a single camera.

6. The method of claim 1, wherein the selecting of the reference image includes:
   for each input image among the input images, determining a correlation value between feature points of each input image and feature points of other input images among the input images based on the matching information; and
   selecting as the reference image an input image among the input images having a highest correlation value.

7. The method of claim 6, wherein the correlation value is determined based on a Euclidian distance between two reprojected points obtained by aligning two corresponding feature points respectively included in two input images to a same two-dimensional plane.

8. The method of claim 7, wherein the correlation value is determined based on a number of the corresponding points having a Euclidian distance less than a threshold distance.

9. The method of claim 1, wherein the determining of the valid images among the input images includes:
    determining a reference correlation value between feature points of the reference image and feature points for each of the input images; and
    determining whether each of the input images is the noise image or the valid image based on the reference correlation value.

10. The method of claim 9, wherein the correlation value is determined based on a Euclidian distance between two reprojected points obtained by aligning two corresponding feature points respectively included in the reference image and the each one of the input images to a same two-dimensional plane.

11. The method of claim 10, wherein the correlation value is determined based on a number of the corresponding feature points having a Euclidian distance less than a threshold distance.

12. The method of claim 1, wherein the performing of the two-dimensional bundle adjustment includes:
    determining a cost function based on the matching information; and
    aligning valid images to the reference image such that a value of the cost function is minimized.

13. The method of claim 12, wherein the cost function is a reprojection error function corresponding to a sum of Euclidian distances between feature points of the reference image and reprojected points obtained by aligning feature points of valid images to a two-dimensional plane corresponding to the reference image.

14. The method of claim 12, wherein determining the cost function includes:
    setting, as independent parameters of the cost function, coordinates of feature points of the reference image and initial homography matrices indicating transformations between the reference image and the valid images.

15. The method of claim 14, wherein aligning the valid images to the reference image includes:
    determining bundle adjustment homography matrices corresponding to the initial homography matrices when the value of the cost function is minimized and bundle adjustment feature points corresponding to the feature points of the reference image when the value of the cost function is minimized.

16. The method of claim 15, wherein the bundle adjustment homography matrices and the bundle adjustment feature points are determined by performing a partial differential operation with respect to the initial homography matrices and the feature points of the reference image.

17. The method of claim 15, wherein the bundle adjustment homography matrices and the bundle adjustment feature points are determined using a Gauss-Newton algorithm or a gradient-descent algorithm.

18. The method of claim 15, wherein performing the two-dimensional bundle adjustment further includes:
    determining a correction matrix indicating transformation between the feature points of the reference image and the bundle adjustment feature points; and
    generating the synchronized images by aligning the feature points of the valid images to a two-dimensional plane corresponding to the reference image using the correction matrix and the bundle adjustment homography matrices.

19. A method of merging images, comprising:
    extracting feature points from input images and generating matching information indicating mapping relationships between feature points included in different input images;
    for each input image among the input images, determining a correlation value between feature points of the each input image and feature points of other input images among the input images based on the matching information;
    selecting, as a reference image, an input image among the input images having a highest correlation value;
    determining valid images among the input images by excluding noise images from the input images based on the matching information;
    determining a cost function based on the matching information such that coordinates of feature points of the reference image and homography matrices indicating transformations between the reference image and the valid images are set as independent parameters of the cost function;
    determining optimal homography matrices and optimal feature points corresponding to a minimum value of the cost function by adjusting feature points of the reference image and the homography matrices;
    determining a correction matrix indicating transformation between feature points of the reference image and the optimal feature points;
    generating synchronized images by aligning feature points of the valid images to a two-dimensional plane corresponding to the reference image using the correction matrix and the optimal homography matrices; and
    generating a merged image by merging the reference image and the synchronized images.

20. A data processing device comprising:
    a feature point generator configured to extract feature points from input images and generate matching information indicating mapping relationships between feature points included in different input images;
    a reference image selector configured to select a reference image among the input images based on the matching information;
    an image filter configured to determine valid images among the input images by excluding noise images from the input images based on the matching information;
    a synchronizer configured to perform a two-dimensional bundle adjustment to generate synchronized images by aligning the valid images to the reference image; and
    an image merger configured to generate a merged image by merging the reference image and the synchronized images.

* * * * *